US010417547B2

(12) United States Patent
Weakley

(10) Patent No.: US 10,417,547 B2
(45) Date of Patent: Sep. 17, 2019

(54) UHF RFID WRISTBAND TRANSPONDER

(71) Applicant: RF DESIGN STUDIOS, LLC, Simpsonville, SC (US)

(72) Inventor: Thomas Craig Weakley, Simpsonville, SC (US)

(73) Assignee: RF DESIGN STUDIOS, LLC, Simpsonville, SC (US)

( * ) Notice: Subject to any disclaimer, the term of this patent is extended or adjusted under 35 U.S.C. 154(b) by 0 days.

(21) Appl. No.: 15/441,449

(22) Filed: Feb. 24, 2017

(65) Prior Publication Data

US 2017/0243100 A1 Aug. 24, 2017

Related U.S. Application Data

(60) Provisional application No. 62/299,254, filed on Feb. 24, 2016.

(51) Int. Cl.
*G06K 19/00* (2006.01)
*G06K 19/07* (2006.01)
*G06K 19/077* (2006.01)

(52) U.S. Cl.
CPC ..... *G06K 19/0726* (2013.01); *G06K 19/0772* (2013.01); *G06K 19/07762* (2013.01); *G06K 19/07773* (2013.01)

(58) Field of Classification Search
USPC .......... 235/435, 439, 454, 487, 492; 340/10, 340/572
See application file for complete search history.

(56) References Cited

U.S. PATENT DOCUMENTS

| 6,597,318 | B1* | 7/2003 | Parsche | H01Q 1/36 343/700 MS |
| 8,925,824 | B2 | 1/2015 | Weakley | |
| 2005/0206572 | A1* | 9/2005 | Apostolos | H01Q 1/243 343/767 |
| 2014/0147579 | A1* | 5/2014 | Conner | H01G 4/33 427/79 |

FOREIGN PATENT DOCUMENTS

WO    WO 2014174153 A1 * 10/2014    ............ H01Q 1/007

* cited by examiner

*Primary Examiner* — Matthew Mikels
(74) *Attorney, Agent, or Firm* — J. Bennett Mullinax, LLC

(57) ABSTRACT

The present invention provides for an RFID transponder, suitable for use in a wristband, which has a non-uniform loop that provides a staple RF environment between the wrist and the transponder; a tuning capacitor for minimizing the overall transponder link; a single transmission line for fine tunings; and an asymmetric location of the RFID IC and capacitor for accommodating needs for specified "keep out" areas for packaging.

10 Claims, 3 Drawing Sheets

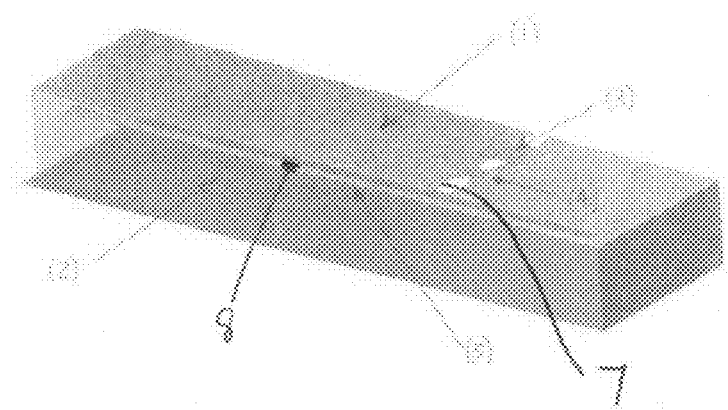
Figure 1, "Basic UHF RFID Wristband Transponder."
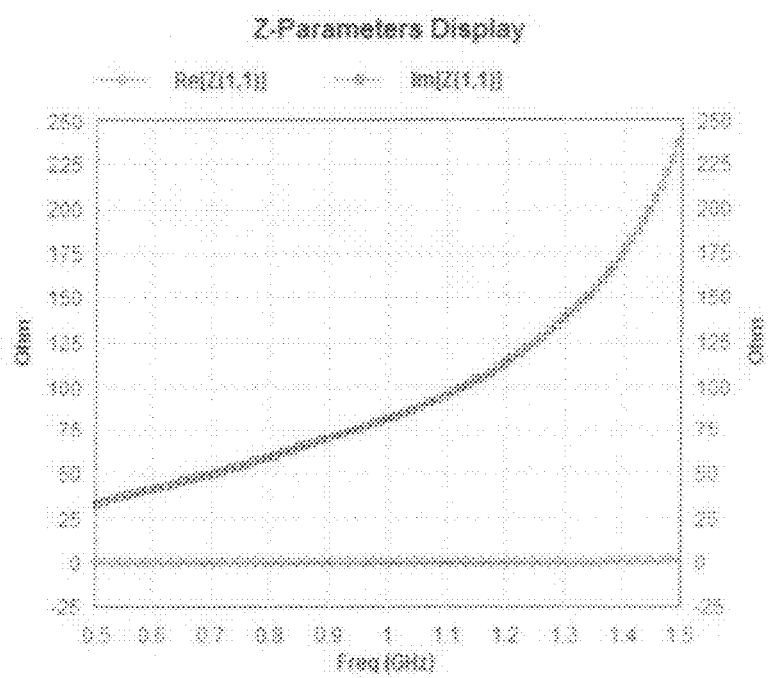
Figure 2, "Antenna Impedance for the Antenna Geometry in Figure 1."

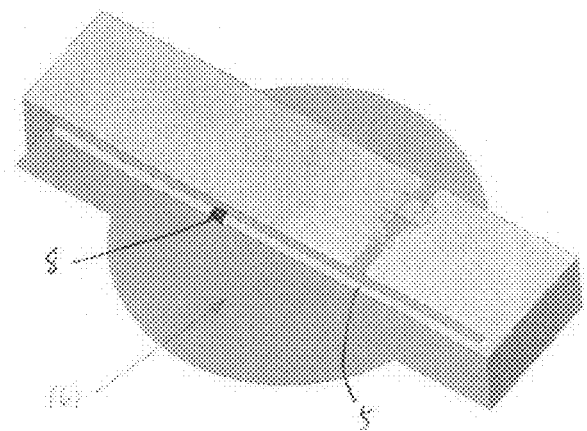
Figure 3. "UHF RFID Wristband Transponder with Non-Uniform Antenna Loop."
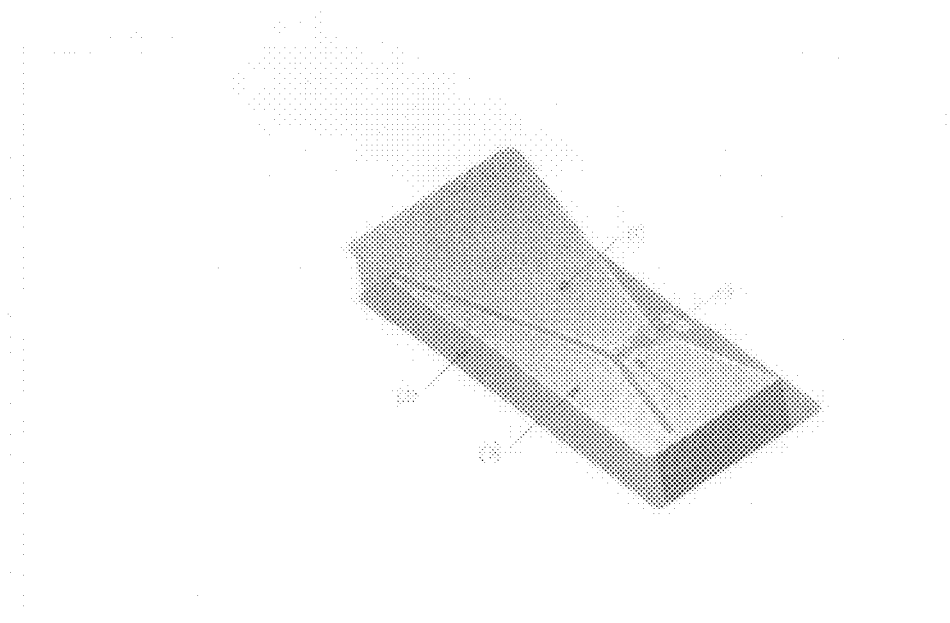
Figure 4. "UHF RFID Wristband Transponder with a Non-Uniform Antenna Loop, Tuning Capacitor and Transmission Line."

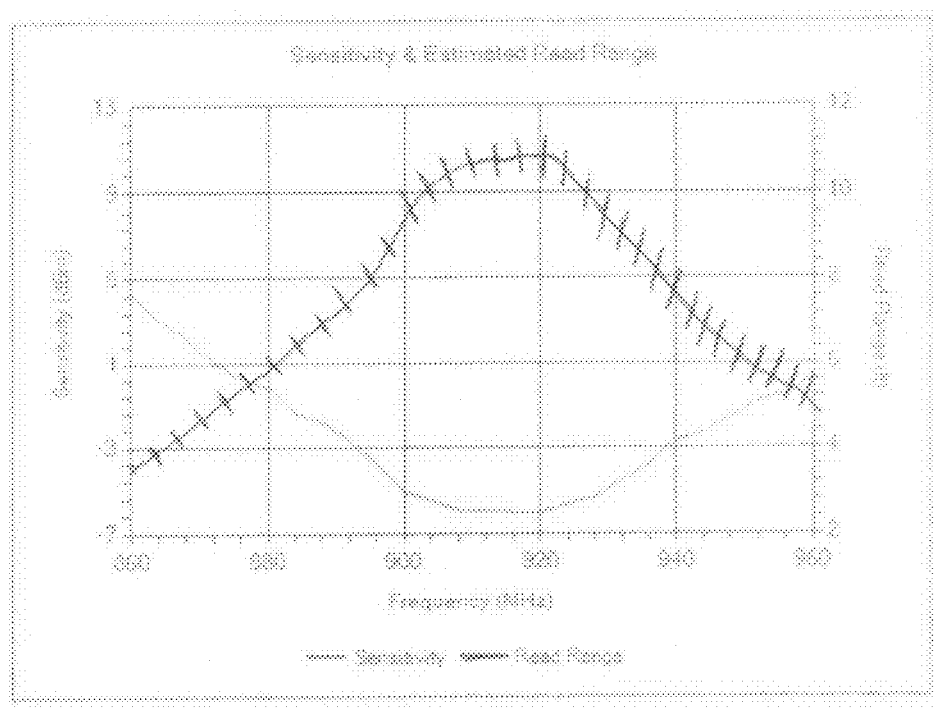
Figure 5. "Measured RF Sensitivity and Estimated Read Range."

UHF RFID WRISTBAND TRANSPONDER

RELATED APPLICATIONS

This application claims the benefit of U.S. Provisional Application Ser. No. 62/299,254 filed on Feb. 24, 2016 and which is incorporated herein by reference.

FIELD OF THE INVENTION

This invention is directed towards the design of an Ultra High Frequency (UHF) Radio Frequency Identification (RFID) transponder intended for use on the human wrist. It contains several novel features which provide high read range performance, in a form factor that is 33% smaller than traditional designs

BACKGROUND OF THE INVENTION

This invention relates to identifying persons utilizing Radio Frequency Identification (RFID) technology. The fabrication of an effective passive RFID tag presents a number of technical challenges. Accordingly, there is room for variation and improvement within the art.

SUMMARY OF THE INVENTION

It is an aspect of at least one embodiment of the present invention to provide for an RFID transponder, suitable for use in a wristband, which has a non-uniform loop that provides a staple RF environment between the wrist and the transponder; a tuning capacitor for minimizing the overall transponder link; a single transmission line for fine tunings; and an asymmetric location of the RFID IC and capacitor for accommodating needs for specified "keep out" areas for packaging.

It is a further aspect of at least one embodiment of this invention to provide for a radio frequency identification (RFID) device comprising:

a dielectric separator; a RFID antenna with a RFID chip connection region that connects the RFID chip to the dielectric separator; a gap defined within the conductive portion of the RFID antenna, the gap defining a location for receiving a capacitor for tuning the RFID device; and, a single transmission line positioned along a portion of a circumference of the antenna loop.

It is a further aspect of at least one embodiment of the present invention to provide for a process of adjusting, the operation frequency of a RFID apparatus comprising the steps of:

providing a radio frequency identification (RFID) apparatus having a dielectric separator; a RFID antenna with a RFID chip connection region that connects the RFID chip to the dielectric separator; a gap defined within the conductive portion of the RFID antenna, the gap defining a location for receiving a capacitor for tuning the RFID device; and, a single transmission line positioned along a portion of a circumference of the antenna loop; and creating a gap within the single transmission line wherein the position of the gap relative to a length of the transmission line varies an operational frequency of the RFID apparatus.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

FIG. 1 sets forth a UHF RFID wristband transponder in accordance with the present invention.

FIG. 2 sets forth the antenna impedance for the antenna geometry of the transponder scene in FIG. 1.

FIG. 3 is a UHF RFID wristband transponder with a non-uniform antenna loop.

FIG. 4 is a UHF RFID wristband transponder with a non-uniform antenna loop, a tuning capacitor, and transmission line.

FIG. 5 is a graph showing the measured RE sensitivity and estimated read range.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various, modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

This specification incorporates by reference U.S. Pat. No. 8,925,824.

It is one aspect of one of the present embodiments to provide for a RFID antenna as seen in FIG. 1 and which is formed by a conductive loop antenna 1, which may be square, rectangular, or other geometric shape. The cross-section of the conductive loop 1 may be circular or flat (ribbon-like). Close proximity of the adjacent portions of the loop will work but the upper and lower loop portions should not touch.

An insulator 2, such as a dielectric separator, is contained within the circumference of the loop. One preferred embodiment of the antenna and insulator is an etched copper trace which defines the loop antenna and which is present on the top and bottom of a printed circuit board. The antenna may be narrow, wide, or irregular in width relative to circuit board or other support substrate. Connections between the top and bottom layers of the printed circuit board is made using traditional techniques such as edge plating, hole plating, as illustrated, and provide for a conductive connection between the upper portion and lower portion of the loop antenna 1.

The loop antenna 1 defines a gap 7 at some point along its circumference. Within a portion of gap 7, the two ends of the loop 1 are attached to an RFID integrated circuit (IC) 3. The IC 3 can be of a convention design commonly used in the industry. A capacitor 4 is also connected across the terminals of the IC and within gap 7 for tuning the antenna to the proper frequency band. A single transmission line 5, in the form of a printed circuit board trace, is attached to the loop for fine tuning and functions as a shunt capacitor.

The antenna loop has resonant frequency based upon the loop dimensions and properties that it will normally operate. Wrapping or placing the loop antenna on opposing sides of a rigid material such as a dielectric, will also affect the resonant frequency. It is possible to adjust the geometry of the loop antenna so that it resonates at a desired frequency by altering the geometry of the loop as well as the selection and thickness of the dielectric material.

The shape of the main loop antenna 1 can be modified which will adjust the resonant frequency. In addition, the provision of a transmission line 5 that operates as a shunt capacitor and allows for tuning of the resulting frequency of the transponder. For instance, trimming some of the transmission line 5 to remove some of the shunt capacitor will shift the frequency to a higher value. The transmission line 5 length and proximity to the loop antenna 1 will also result in modification of the resonant frequency.

Conjugate matching techniques are commonly used for matching the impedance of the antenna to the RFID IC 3. The dimensions of the antenna determine its impedance. For antennas less than a quarter of a wavelength, the imaginary part of the impedance is inductive (+jXa). The imaginary part of the impedance for all RFID ICs is capacitive (-jXc). The design goal is to adjust the dimensions of the antenna so the real part of the antenna impedance equals the real part of the RFID IC, and the imaginary part of antenna impedance is equal, but positive (inductive).

$$R_{antenna} = R_{IC},$$

and $$X_{antenna} = -X_{IC}$$

By adding the capacitor across the antenna terminals, the length of the, antenna can be significantly reduced while maintaining a similar match condition. The antenna impedance for the antenna geometry depicted in FIG. 1 is shown in FIG. 2. The antenna is 1" (25.4 mm) long, 0.4" (10 mm) wide, and 0.125" (3.2 mm) tail using a printed circuit board as the insulator. The theoretical antenna impedance at 915 MHz is 3+j68 ohms. The conjugate match conditions are met when a 2.2 pF capacitor is placed across the IC terminals, ($Z_{load}$=3-j68 ohms). Without the capacitor, based on EM simulations, the antenna would need to be 1.585" long, or 50% longer for meeting the same match conditions.

This design incorporates a single transmission line 5 which connects to, any location along the circumference of the loop for fine tuning. As the length of the transmission line is reduced, the operational frequency of the RFID transponder increases. As the length is increased, the operational frequency decreases. By establishing a gap 8 within the transmission line, one can fine tune the operational frequency. Capacitor ratings of between 0.1 to 10 pF are useful with the present embodiments of the invention.

In designing RFID transponders for use as wristbands, the design of the loop should attempt to provide a stable RF interface with the wrist. In some embodiments, the portion of the loop which will be nearest to the wrist (parallel to the wrist) is wider than it is on the opposing side of the loop 6. Testing from RFID transponders like that pictured below in FIG. 3, has shown a 10% read range improvement over those transponders with a loop having a uniform width. One such embodiment is displayed in FIG. 4. The wristband RFID transponder incorporates:

a non-uniform loop—for providing a stable RF environment between the wrist and the transponder, a tuning capacitor for minimizing the overall transponder length, a single transmission line for fine tuning asymmetric location of the RFID IC and capacitor for accommodating customer specified "keep out" areas, needed for packaging.

The typical read range and RF sensitivity for the transponder similar to FIG. 4, while worn on a wrist is depicted in FIG. 5. Across the North American ISM frequency band (902 to 928 MHz), the average RF sensitivity is less than −5 dBm and the average read range is greater than 10' using an FCC approved reader system with a 4W EIRP.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the claims of the present invention. In addition, it should be understood that aspects of the various embodiments may be interchanged, both in whole, or in part. Therefore, the spirit and scope of the invention should not be limited to the description of the preferred versions contained therein.

That which is claimed:

1. A radio frequency identification (RFID) apparatus comprising:

a dielectric separator;

a RFID loop antenna with a RFID chip connection region that connects a RFID chip to the dielectric separator, the RFID loop antenna having a width on a first side of the dielectric separator greater than a width on a second side of the dielectric separator;

a gap defined within the conductive portion of the RFID loop antenna; a shunt capacitor for tuning the RFID device, the shunt capacitor positioned within the gaps and forms a single transmission line positioned along a portion of a circumference of the antenna loop, the shunt capacitor further connected to a terminal of the RFID chip.

2. The RFID apparatus according to claim 1 wherein the single transmission line defines a gap along a length of the transmission line, a position of the gap affecting a frequency at which the RFID apparatus operates.

3. The RFID apparatus according to claim 1 wherein the capacitor has a 2.2 pF value.

4. A radio frequency identification (RFID) apparatus consisting of:

a dielectric separator;

a RFID loop antenna with a RFID chip connection region that connects a RFID chip to the dielectric separator, the RFID loop antenna having a width on a first side of the dielectric separator greater than a width on a second side of the dielectric separator;

a gap defined within the conductive portion of the RFID loop antenna, a capacitor for tuning the RFID device the capacitor positioned within the gap; and, a shunt capacitor in the form of a single transmission line positioned along a portion of a circumference of the antenna loop.

5. The RFID apparatus according to claim 4, wherein the single transmission line defines a gap along a length of the transmission line.

6. The RFID apparatus according to claim 3 wherein the capacitor has a pF value of between about 0.5 to about 3.0.

7. The RFID apparatus according to claim 4 wherein the capacitor has a 2.2 pF value.

8. The RFID apparatus according to claim 4 wherein the capacitor has a pF value of between about 0.5 to about 3.0.

9. The apparatus according to claim 1 wherein the RFID apparatus radiates in the same plane as the loop antenna.

10. The apparatus according to claim 4 wherein the RFID apparatus radiates in the same plane as the loop antenna.

\* \* \* \* \*